(12) United States Patent
Patwari et al.

(10) Patent No.: US 10,001,544 B2
(45) Date of Patent: Jun. 19, 2018

(54) METHOD AND ELECTRONIC DEVICE IDENTIFYING INDOOR LOCATION

(71) Applicant: Samsung Electronics Co., Ltd., Suwon-si, Gyeonggi-do (KR)

(72) Inventors: Ayush Patwari, Kolkata (IN); Gaurav Mishra, Cuttack (IN); Rupika Srivastava, Lucknow (IN); Aloknath De, Bangalore (IN); Deepraj Prabhakar Patkar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 15/131,685

(22) Filed: Apr. 18, 2016

(65) Prior Publication Data

US 2016/0349349 A1 Dec. 1, 2016

(30) Foreign Application Priority Data

May 27, 2015 (IN) .......................... 2661/CHE/2015
Apr. 7, 2016 (KR) ........................ 10-2016-0042937

(51) Int. Cl.
| | | |
|---|---|---|
| G01S 3/02 | (2006.01) | |
| G01S 5/08 | (2006.01) | |
| G01S 5/02 | (2010.01) | |
| G01S 5/14 | (2006.01) | |
| G01C 21/20 | (2006.01) | |
| G01S 5/16 | (2006.01) | |

(52) U.S. Cl.
CPC .......... *G01S 5/0252* (2013.01); *G01C 21/206* (2013.01); *G01S 5/0247* (2013.01); *G01S 5/14* (2013.01); *G01S 5/16* (2013.01)

(58) Field of Classification Search
CPC ............................... G01C 21/206; G01S 5/08

USPC ..... 342/443, 452, 457, 458; 455/456.6, 457; 715/734

See application file for complete search history.

(56) References Cited

U.S. PATENT DOCUMENTS

| | | | | |
|---|---|---|---|---|
| 2003/0080992 A1* | 5/2003 | Haines | .................. | H04W 99/00 715/734 |
| 2006/0247847 A1* | 11/2006 | Carter | ..................... | A47F 10/04 701/498 |
| 2010/0253624 A1* | 10/2010 | Wilson | .................. | G06F 3/0346 345/158 |

* cited by examiner

*Primary Examiner* — Dao L Phan
(74) *Attorney, Agent, or Firm* — Jefferson IP Law, LLP

(57) ABSTRACT

Embodiments of the present disclosure provide a method for identifying an indoor environment location. The method includes an operation of obtaining a visibility map of an indoor environment. The visibility map may include a plurality of static markers in the indoor environment. The method can determine a direction of a first static marker with respect to magnetic north by an electronic device if the electronic device is located to point at the first static marker and can determine a direction of a second static marker with respect to magnetic north if the electronic device is disposed to point at the second static marker. The method can calculate an intersecting point based on the determined first static marker and second static marker and can identify a location of the electronic device in an indoor environment. The method may further include an operation of determining directions of objects (for example, first static marker and second static marker) in an indoor environment corresponding to a plurality of locations of the electronic device. Further, the method may include an operation of identifying a location of an object in an indoor environment by calculating an intersecting point of the determined directions of the objects.

15 Claims, 8 Drawing Sheets

METHOD AND ELECTRONIC DEVICE IDENTIFYING INDOOR LOCATION

CROSS-REFERENCE TO RELATED APPLICATION(S)

This application claims the benefit under 35 U.S.C. § 119(a) of an Indian patent application filed on May 27, 2015 in the Indian Patent Office and assigned Serial number 2661/CHE/2015, and of a Korean patent application filed on Apr. 7, 2016 in the Korean Intellectual Property Office and assigned Serial number 10-2016-0042937, the entire disclosure of which is hereby incorporated by reference.

TECHNICAL FIELD

The present disclosure relates to indoor positioning techniques. More particularly, the present disclosure relates to a mechanism for identifying a location of an electronic device in an indoor environment by computing an intersection point of determined directions of a plurality of static markers.

BACKGROUND

Currently, techniques for identifying a location of an electronic device in an enclosed space use various sources of information including wireless signal strength, radio frequency (RF) signal strength, pedestrian tracking systems and/or a combination thereof. For example, in an existing system, a pedestrian dead reckoning technique utilizes heading information of the user to continuously calculate the user's steps taken, step length and the direction of the user information. Based on the calculated movement of the user, the location is updated on a floor map after each step. In another existing system, a Wi-Fi signal or RF signal is used for periodically correcting a position estimate of the user. Based on the calculated position estimation of the user, the location is updated on the floor map after each step.

In another existing system, a position tracking system uses a database of known Wi-Fi transmitters or other unregulated RE transmitters. The database in each case however, must be regularly maintained and updated to provide good accuracy. In some cases, the database can be updated manually. Further, maintenance of the database requires expensive tracking equipment, trained field person to survey locations, and regular updates. Additionally, such approaches do not address changing signal environments or changing signal conditions.

In yet another existing system, a position tracking system utilizes a ray tracing propagation model for indoor signal strength modelling, a sparse extended information filter approach, and other approaches based on dead reckoning, but requires prior information about a shape, layout, and sometimes materials of the location. This approach can work if there are pre-existing maps and shape information that an authoritative source can provide. However, this technique is often too computationally complex to run within the constraints of a mobile device.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages, and to provide at least the advantages described below. Accordingly, an aspect of the present disclosure is to provide a method for identifying a location of an electronic device in an indoor environment by computing an intersection point of determined directions of a plurality of static markers.

Another aspect of the present disclosure is to provide an electronic device for identifying a location of the electronic device in the indoor environment by computing an intersection point of determined directions of the plurality of static markers.

Another aspect of the present disclosure is to provide a mechanism for identifying a location of an object in the indoor environment.

In accordance with an aspect of the present disclosure, an indoor environment location identifying method is provided. The indoor environment location identifying method includes obtaining a visibility map of an indoor environment. The visibility map includes a first static marker and a second static marker in the indoor environment. The method further includes determining directions of the first static marker and the second static marker with respect to magnetic north, when a user points an electronic device toward the first static marker and the second static marker. The method further includes identifying a location of the electronic device in the indoor environment by computing an intersection point of the determined directions of the first static marker and the second static marker.

In accordance with another aspect of the present disclosure, an electronic device is provided. The electronic device is configured to obtain a visibility map of an indoor environment. The visibility map includes a first static marker and a second static marker in the indoor environment. The electronic device is further configured to determine directions of the first static marker and the second static marker with respect to magnetic north, when a user points an electronic device toward the first static marker and the second static marker. The electronic device is further configured to identify a location of the electronic device in the indoor environment by computing an intersection point of the determined directions of the first static marker and the second static marker.

In accordance with another aspect of the present disclosure, a computer executable program code recorded on a computer readable non-transitory storage medium is provided. The computer executable program code when executed by a processor, configures the processor to obtain a visibility map of an indoor environment. The visibility map includes a first static marker and a second static marker in the indoor environment. The computer executable program code when executed further configures the processor to determine directions of the first static marker and the second static marker with respect to magnetic north, when a user points an electronic device toward the first static marker and the second static marker. The computer executable program code when executed further configures the processor to identify a location of the electronic device in the indoor environment by computing an intersection point of the determined directions of the first static marker and the second static marker.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
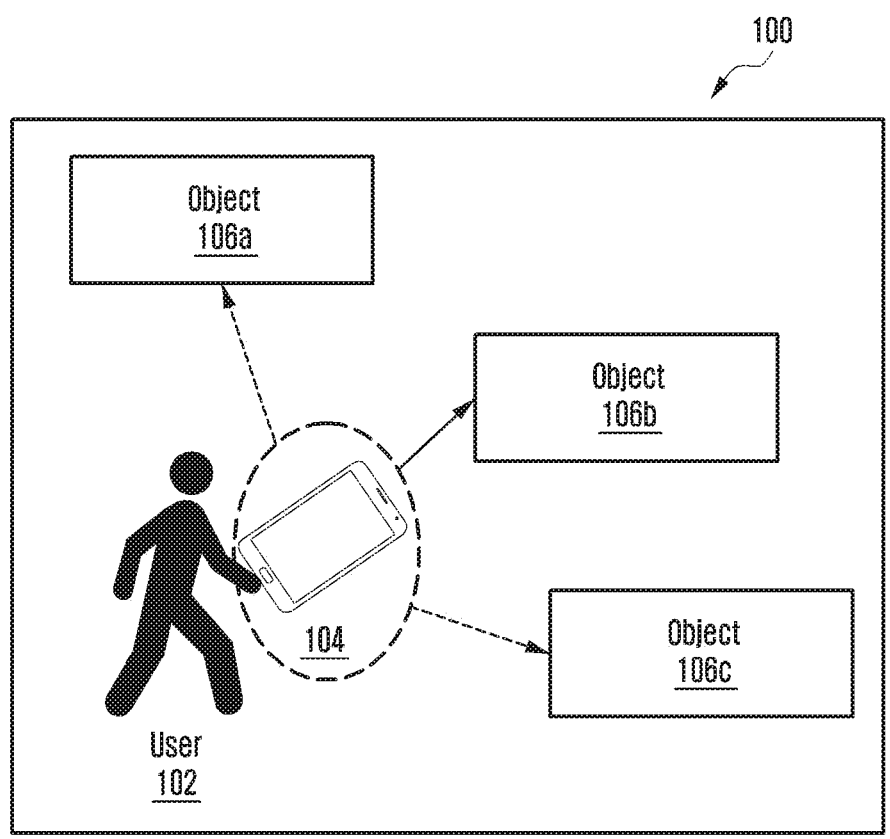
FIG. 1 illustrates a high level overview of a system for identifying a location of an object in an indoor environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments. The term "or" as used herein, refers to a non-exclusive or, unless otherwise indicated, The examples used herein are intended merely to facilitate an understanding of ways in which the various embodiments herein can be practiced, and to further enable those skilled in the art to make and practice the various embodiments herein. Accordingly, the examples should not be construed as limiting the scope of the various embodiments herein.

Prior to describing the present disclosure in detail, it may be useful to provide definitions for key terms and concepts used herein, Unless defined otherwise, technical and scientific terms used herein have the same meaning as commonly understood by one of ordinary skill in the art.

A visibility map as used herein refers to a specific area or areas within a line of sight of an indoor environment. The visibility map can be expressed on a two dimensional (2D) map or three dimensional (3D) map in the form of colored or highlighted areas on the map, but embodiments are not limited thereto. In some cases, the visibility maps in 3D space can be expressed as a 3D construction, limited at least by the line of sight of the indoor environment.

The terms electronic device and mobile device are used interchangeably throughout the description.

The terms indoor environment and an enclosed space are used interchangeably throughout the description.

In the appended aspects or claims, the terms "first static marker", "second static marker" and "third static marker" are used merely as labels, and are not intended to impose numerical or sequential requirements on their objects. Also, a first location and a second location are used only for illustrative purposes, and do not limit the scope of the disclosure.

The various embodiments disclosed herein achieve an indoor environment location identification method. The method includes obtaining a visibility map of an indoor environment. The visibility map includes at least a first static marker and a second static marker in the indoor environment. Further, the method includes determining directions of the first static marker and the second static marker with respect to magnetic north, when a user points an electronic device toward the first static marker and the second static marker, respectively. Further, the method includes computing an intersection point of the determined directions of the first static marker and the second static marker. Further, the method includes identifying a location of the electronic device in the indoor environment.

The method also includes determining a direction of an object in the indoor environment with respect to a first location of the user and a second location of the user. Further, the method includes computing an intersection point of the determined direction of the object. Still further, the method includes identifying a location of the object in the indoor environment.

In an embodiment of the present disclosure, the object is disposed by further considering vertical placement of the object from a ground surface in the indoor environment.

Unlike systems of the related art, the proposed method identifies a location of the user in the indoor environment using the electronic device, the static markers, and magnetic north. Magnetic north is used in embodiments of the present disclosure, since it is an easily discerned and relatively constant reference variable known to those skilled in the art. Any number of technologies can be used by the elements of the embodiments to identify and/or measure magnetic north, such as a compass. in other embodiments, other suitable reference variables may be used in addition to or in place of magnetic north. The location information of the user in the indoor environment is useful to a smart home control system, where the user will be able to control an object by directly pointing toward the object using the electronic device in a cost effective and quick manner.

The proposed method does not require additional infrastructure (e.g. WiFi router) or generate maps of signal strength (e.g. magnetic field) for the indoor environment. The proposed method is free from effects of magnetic fields apart from the earth's magnetic field. This results in identifying a location of the electronic device(the object) in an accurate and consistent manner.

Referring to the drawings and more particularly to FIGS. 1 through 8, where similar reference characters denote corresponding features consistently throughout the figure, there are shown a number of embodiments.

FIG. 1 illustrates a high level overview of a system for identifying a location of an object in an indoor environment according to various embodiments of the present disclosure.

Referring to FIG. 1, a system 100 includes a user 102, an electronic device 104, and a set of objects 106a to 106c at various locations around the user. For the following discussion, object 106a will be described, but any of the objects 106a, 106b, 106c, or others not shown, or combinations thereof, can be used in substantially the same manner.

In an embodiment of the present disclosure, the electronic device 104 can be for example, but not limited to, a smart phone, smart watch, ultra-mobile personal computer (UMPC), smart band, smart glasses, smart ring, tablet PC, personal digital assistant (PDA), mapping unit, laptop, or other similar type of electronic device. The object 106a can be for example, but not limited to, a smart television (TV), smart refrigerator, smart air conditioner (AC) unit, smart light, smart oven, and the like. In an embodiment of the present disclosure, the objects 106a to 106c can be connected over a home network protocol for communicating with each other and with components outside the system 100. The indoor environment can be rooms in buildings or any enclosed space.

The electronic device 104 obtains a visibility map of the indoor environment. The visibility map includes a plurality of static markers in the indoor environment. A static marker can be for example, but not limited to, an edge of a wall intersection, ceiling intersection or floor intersection, a door or door edge, a window or window edge, a room corner, room pillars, and the like. In an embodiment of the present disclosure, a static marker can also be an external marker which is installed inside the room including a quick response (QR) code, barcode and the like.

One or more of the static markers are visible to the user from any position inside the indoor environment. The static markers are provided to the electronic device in a structure model form, but embodiments are not limited thereto. A structure model can be a design file, drawing file, or other type of electronic representation that describes an interior configuration of the indoor environment.

After obtaining the visibility map of the indoor environment, the electronic device 104 determines directions of the static markers with respect to magnetic north, when a user 102 points the electronic device 104 toward the static markers, respectively. In an embodiment, the electronic device may have a lengthwise axis and/or first and second ends. Pointing of the electronic device therefore can describe alignment of the axis with a pointing target, and/or facing one of the first or second ends toward the pointing target, but embodiments are not limited thereto. Features of the electronic device can detect a pointing operation, or can be triggered to recognize a pointing operation. For example, if the electronic device is disposed toward a static marker based on a determined reference posture or reference direction, the electronic device can identify an operation of pointing the static marker. The electronic device can be disposed in a reference posture or reference direction (for example, a posture of disposing the top center of the display of the electronic device toward a ceiling, or a posture of disposing the display of the electronic device parallel to a ground surface). According to various embodiments of the present disclosure, the disposition of the electronic device can be identified by a user input after disposing the electronic device in a reference direction. For example, the electronic device can identify the disposition of the electronic device in a reference direction corresponding to the number of individual static markers. In this case, the electronic device can identify the disposition of the electronic device with respect to magnetic north.

Figure 4:
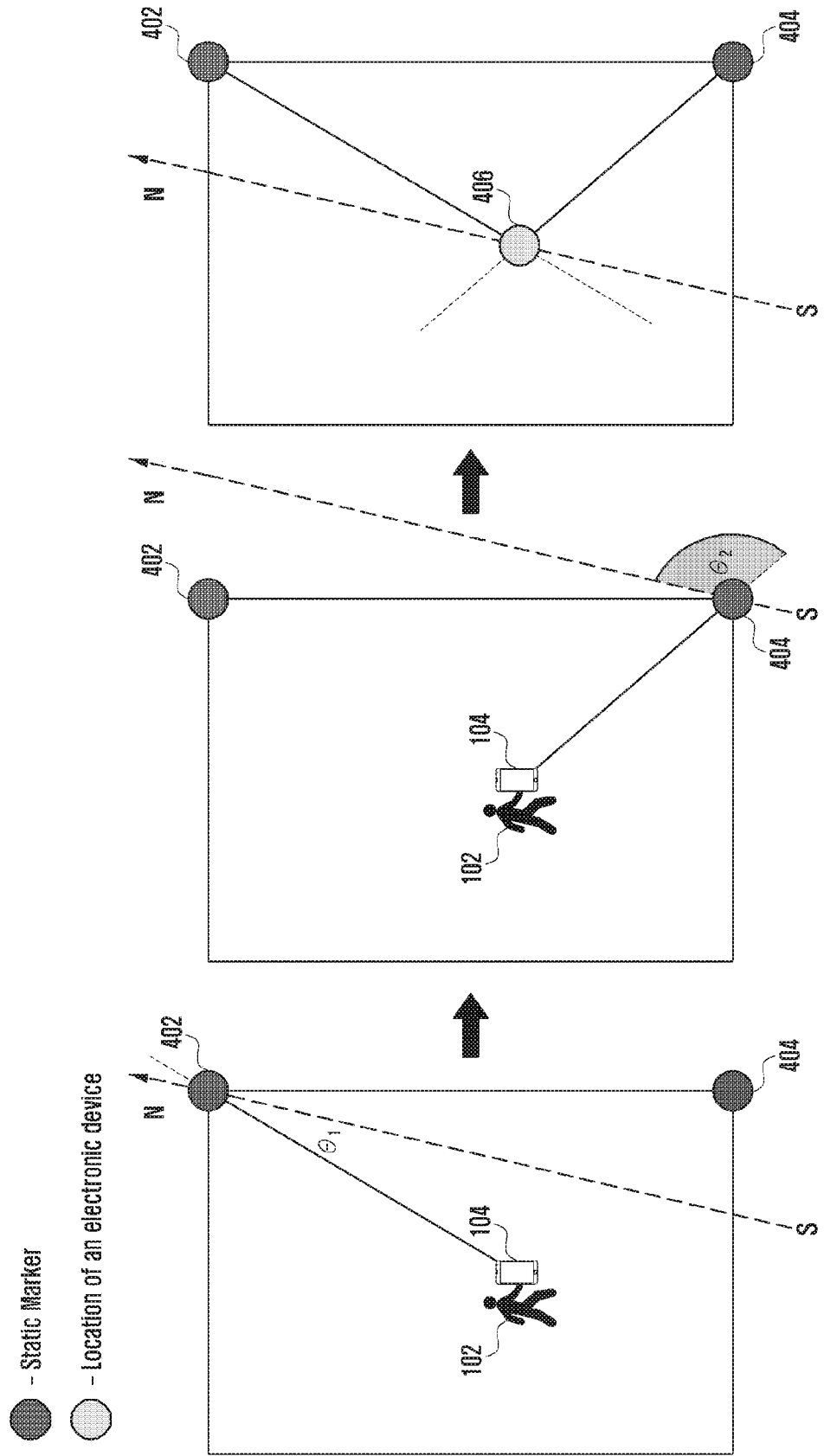
FIG. 4 is an illustration of identifying a location of an electronic device in an indoor environment according to various embodiments of the present disclosure.
Figure 5:
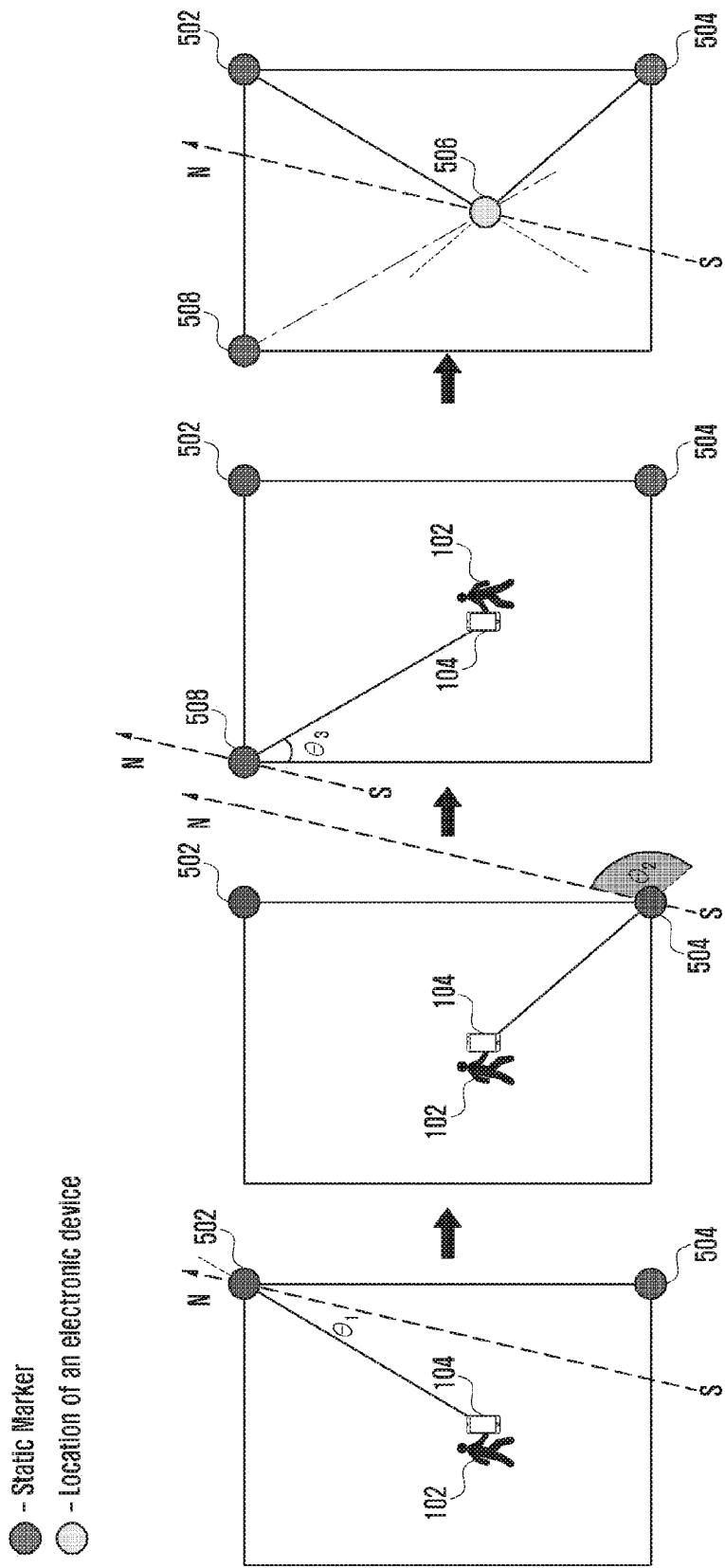
FIG. 5 is another illustration of identifying a location of an electronic device in an indoor environment according to various embodiments of the present disclosure.

Based on the determined directions of the static markers with respect to magnetic north, the electronic device 104 computes an intersection point of the determined directions of the static markers. After computing the intersection point of the determined directions of the static markers, the electronic device 104 identifies a location of the electronic device 104 in the indoor environment at the computed intersection point as illustrated in FIGS. 4 and 5.

The electronic device 104 according to various embodiments of the present disclosure can assign (set) the reference direction to a magnetic (compass) direction. According to the present disclosure, the electronic device 104 can be disposed in a compass direction, and a direction to a static marker can be calculated by receiving an input of each corresponding static marker. For example, the electronic device can receive inputs of directions to each static marker from a user in a state of being disposed corresponding to the compass direction. The electronic device 104 can identify a location of the electronic device 104 based on the input directions to each static marker.

Figure 6:
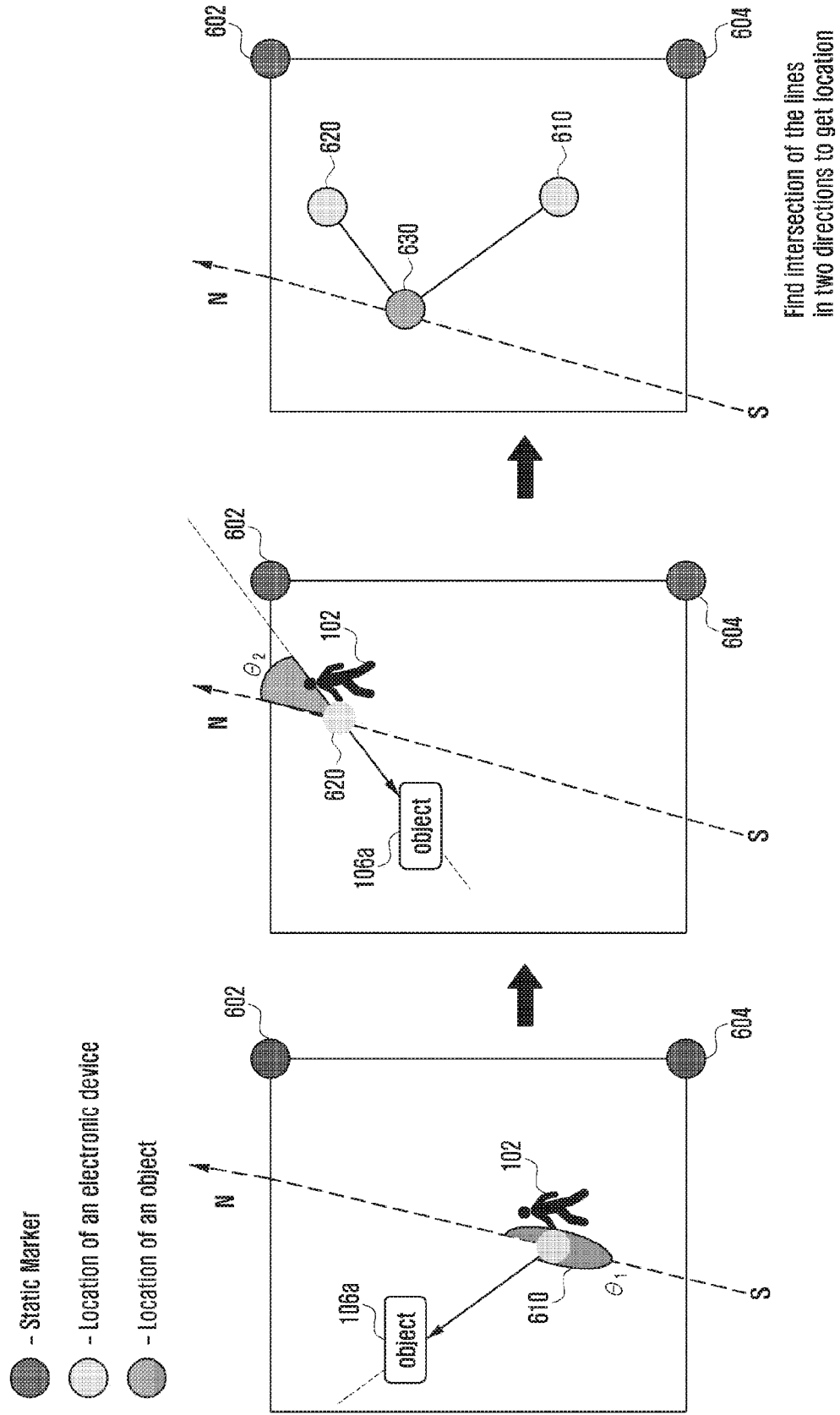
FIG. 6 is an illustration of identifying a location of an object in an indoor environment according to various embodiments of the present disclosure.

In an embodiment of the present disclosure, the electronic device 104 then determines directions of the object 106a in the indoor environment with respect to a set plurality of locations of the user 102. Based on the determined directions of the object 106a in the indoor environment with respect to the locations of the user 102, the electronic device 104 computes an intersection point of the determined directions of the object 106a. After computing the intersection point of the determined directions of the object 106a, the electronic device 104 identifies a location of the object 106a in the indoor environment at the computed intersection point as illustrated in FIG. 6.

In an embodiment of the present disclosure, the object 106a is disposed by also considering vertical placement of the object 106a from a ground surface in the indoor environment.

In an example using a smart watch as the electronic device 104, initially, the smart watch obtains the visibility map of the room of the building. The visibility map includes a first corner and a second corner of the room of the building as static markers. A smart watch may be disposed toward a first corner corresponding to a direction to the first corner with respect to magnetic north. Alternatively, the smart watch may be disposed toward a second corner corresponding to a direction to the second corner with respect to magnetic north. The user 102 points the smart watch toward the first corner to determine the direction of the first corner with respect to magnetic north. Further, the user 102 points the smart watch toward the second corner to determine the direction of the second corner with respect to magnetic north. Any number of technologies can be used by the smart watch to identify and target the static markers, measure magnetic north, and determine the directions of the static markers with respect to magnetic north. Based on the determined directions of the first corner and the second corner, the smart watch computes the intersection point of the determined directions of the first corner and the second corner using, for example, one or more algorithms as described in greater detail below. Based on the computed intersection point, the smart watch then identifies a location of the electronic device in the room of the building at the computed intersection point.

FIG. 1 shows a limited overview of the system 100, but embodiments are not limited thereto. Further, the system 100 can include any number of electronic devices 104 along with other hardware or software components communicating with each other. For example, the other components can be, but not limited to, a process running in the controller or processor, an object, an executable process, a thread of execution, a program, or a computer. By way of illustration, both an application running on the electronic device 104 and the electronic device 104 itself, can be a component.

Figure 2:
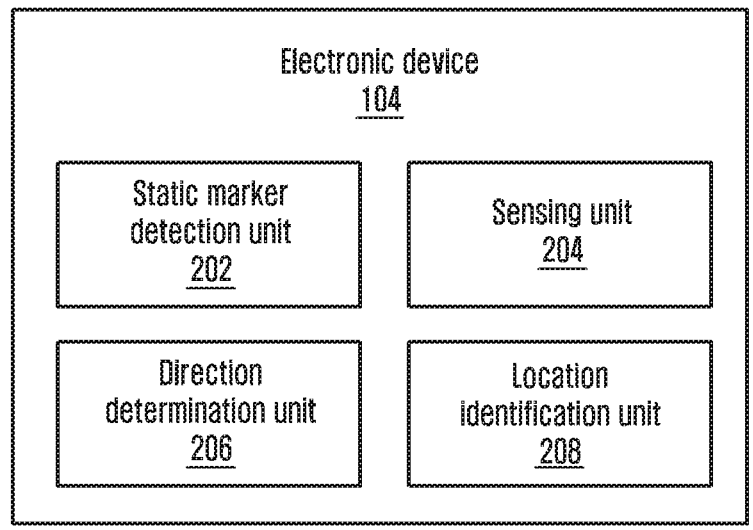
FIG. 2 is a block diagram of an electronic device according to various embodiments of the present disclosure.

FIG. 2 is a block diagram of an electronic device according to various embodiments of the present disclosure.

Referring to FIG. 2, an electronic device 104 includes a static marker detection unit 202, a sensing unit 204, a direction determination unit 206, and a location identification unit 208. The static marker detection unit 202 is configured to obtain the visibility map of the indoor environment. As noted above, the visibility map includes the static markers in the indoor environment. After obtaining the visibility map of the indoor environment, the direction determination unit 206 is configured to determine the directions of the static markers with respect to magnetic north by using various techniques (e.g. sensor fusion techniques, and the like), when the user points the sensing unit 204 toward the first static marker and the second static maker, respectively. The sensing unit 204 can be for example, but not limited to, an accelerometer, gyroscope, magnetometer, compass, GPS, and the like. The process of pointing the electronic device 104 to a first static marker and a second static marker can be performed through the sensing unit 204 by disposing the electronic device 104 toward the first and second static markers based on a determined reference posture or reference direction.

Based on the determined directions of the static markers, the location identification unit 208 is configured to compute the intersection point of the determined directions of the static markers. After computing the intersection point of the determined directions of the static markers, the location identification unit 208 is configured to identify a location of the electronic device 104 in the indoor environment at the computed intersection point.

In an embodiment of the present disclosure, the direction determination unit 206 is configured to determine the directions of the object 106a in the indoor environment with respect to the locations of the user 102. Based on the determined directions of the object 106a in the indoor environment with respect to the locations of the user 102, the electronic device 104 computes the intersection point of the determined directions of the object 106a. After computing the intersection point of the determined directions of the object 106a, the location identification unit 208 is configured to identify a location of the object 106a in the indoor environment at the computed intersection point.

In an embodiment of the present disclosure, the object 106a is disposed by also considering vertical placement of the object 106a from the ground surface in the indoor environment.

FIG. 2 shows a limited overview of the electronic device 104, but embodiments are not limited thereto. Further, the electronic device 104 can include any number of units communicating with each other, along with the other components of the system 100 and with components outside the system 100.

Figure 3:
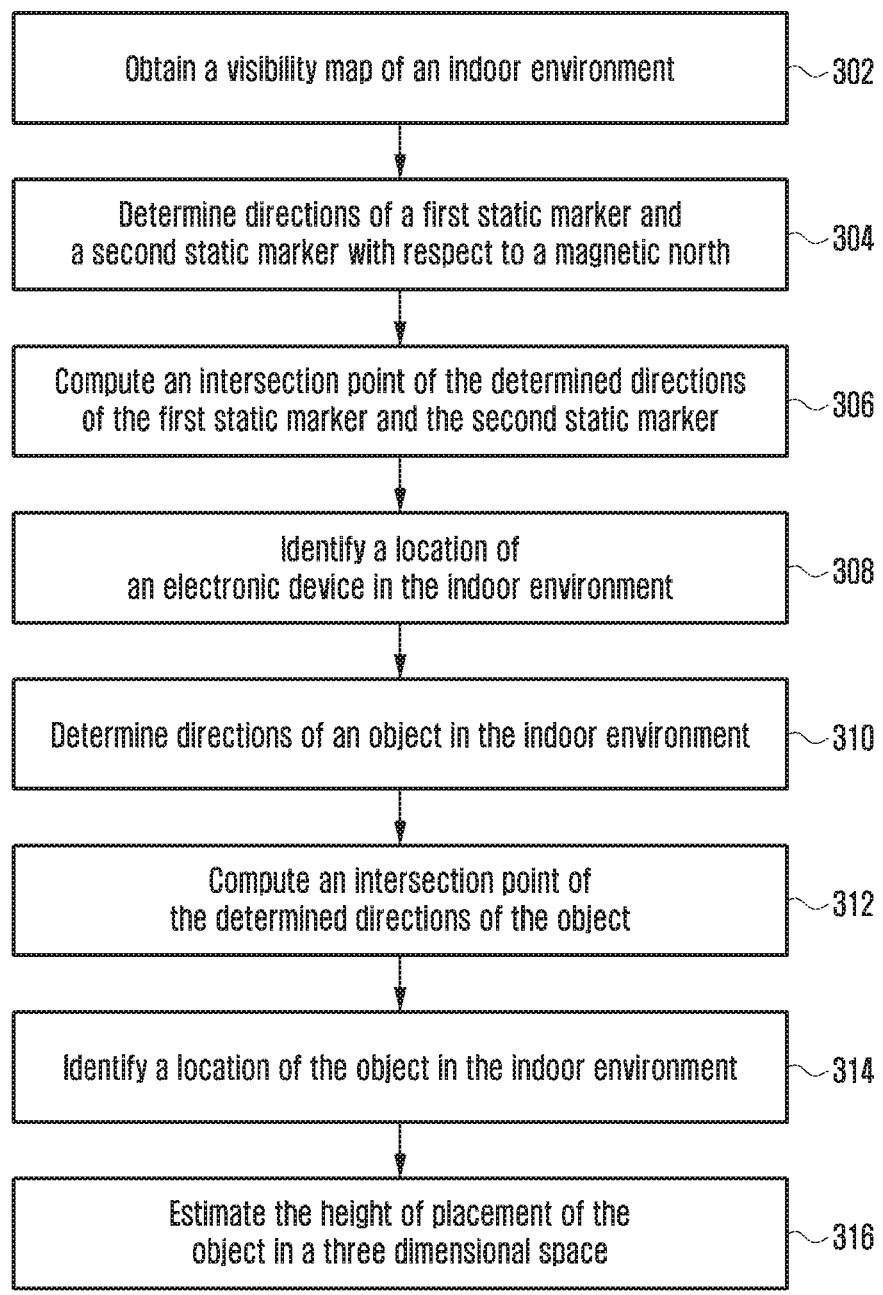
FIG. 3 is a flowchart illustrating a method for identifying a location of an object in an indoor environment according to various embodiments of the present disclosure.

FIG. 3 is a flowchart illustrating a method for identifying a location of an object in an indoor environment according to various embodiments of the present disclosure.

Referring to FIG. 3, at operation 302, the method includes obtaining a visibility map of an indoor environment. In an embodiment, the static marker detection unit 202 is used to obtain the visibility map of the indoor environment. The visibility map includes the static markers in the indoor environment.

At operation 304, the method includes determining directions of the static markers with respect to magnetic north. In an embodiment, the direction determination unit 206 is used to determine the directions of the static markers with respect to magnetic north by using any existing technique.

At operation 304, the electronic device according to the present disclosure can identify a disposition to a static marker based on a determined reference posture or reference direction. If the electronic device is disposed corresponding to the determined reference posture or reference direction, the electronic device can identify that the electronic device is pointing at the static marker. The electronic device according to various embodiments of the present disclosure can identify that the electronic device has been finally disposed according to a user input if the electronic device is disposed in the reference posture or reference direction. The electronic device according to various embodiments of the present disclosure can identify the disposition of the electronic device corresponding to the number of individual static markers. The electronic device according to the present disclosure can determine the directions of static markers responding to the completion of disposing the electronic device.

Further at operation 304, the electronic device according to the present disclosure can assign (set) the reference direction to a magnetic (compass) direction. The electronic device can be disposed in a compass direction, and directions to each static marker can be calculated by receiving inputs of each corresponding static marker. For example, the electronic device can receive inputs of directions to each static marker from a user in a state of being disposed corresponding to a compass direction. The electronic device 104 can identify a location of the electronic device 104 based on the input directions to each static marker. The electronic device according to the present disclosure can determine directions of each static marker in a state of being disposed corresponding to the compass direction.

At operation 306, the method includes computing the intersection point of the determined directions of the static markers, in an embodiment, the location identification unit 208 is used to compute the intersection point of the determined directions of the static markers.

At operation 308, the method includes identifying a location of an electronic device 104 in the indoor environment. In an embodiment, the location identification unit 208 is used to identifying a location of an electronic device 104 in the indoor environment at or near the intersection point.

At operation 310, the method includes then determining directions of the object 106a in the indoor environment, in an embodiment, the direction determination unit 206 is used to determine the directions of the object 106a in the indoor environment with respect to a plurality of locations of the user 102.

At operation 312, the method includes computing the intersection point of the determined directions of the object 106a. In an embodiment, the location identification unit 208 is used to compute the intersection point of the determined directions of the object 106a. At operation 314, the method includes identifying a location of the object 106a in the indoor environment. In an embodiment, the location identification unit 208 is used to identify a location of the object 106a in the indoor environment at or near the intersection point.

At operation 316, the method includes estimating a height of placement of the object 106a in a 3D space. In an embodiment, the location identification unit 208 is used to estimate the height of placement of the object 106a in the 3D space. In an embodiment, the location identification unit 208 can then be used to identify a location of the object 106a in a 3D manner at or near the intersection point by considering the height of placement of the object 106a.

The various actions, acts, blocks, operations, and the like in the method may be performed in the order presented, in a different order, or in parallel or simultaneously. Further, in some embodiments, some actions, acts, blocks, operations, and the like may be combined, omitted, added, modified, skipped, and the like without departing from the scope of the disclosure.

FIG. 4 is an illustration of identifying a location of an electronic device in an indoor environment according to various embodiments of the present disclosure.

Referring to FIG. 4, an electronic device 104 obtains the visibility map of an indoor environment. The visibility map includes the first static marker 402 and the second static marker 404 in the indoor environment. Here, the first and second static markers are shown in an identifiable color shade in a circular form in the indoor environment.

The user 102. then points the electronic device 104 toward the first static marker 402 to determine the direction of the first static marker with respect to magnetic north (NS), An angle θ1 is determined with respect to a direction of the user 102 and the direction of the first static marker 402. The user 102 then points the electronic device 104 toward the second static marker 404 to determine the direction of the second static marker with respect to magnetic north. An angle θ2 is determined with respect to a direction of the user 102 and the direction of the second static marker 404.

Based on the determined directions and angles of the user 102, the first static marker 402, and the second static marker 404, the electronic device 104 computes the intersection point 406 of the determined directions of the first static marker 402 and the second static marker 404. Based on computed intersection point 406 of the determined directions of the first static marker 402 and the second static marker 404, the electronic device 104 identifies a location of the electronic device 104 in the indoor environment at the intersection point 406. The location identification of the electronic device is shown in an identifiable color shade in a circular form at the intersection point 406.

FIG. 5 is another illustration of identifying a location of an electronic device in an indoor environment according to various embodiments of the present disclosure.

Referring to FIG. 5, an electronic device 104 obtains a visibility map of an indoor environment. The visibility map includes a first static marker 502, a second static marker 504, and a third static marker 508 in the indoor environment. Here, the first, second and third static markers are shown in an identifiable color shade in a circular form.

A user 102 points the electronic device 104 toward the first static marker 502 to determine the direction of the first static marker with respect to magnetic north (NS). An angle θ1 is determined with respect to a direction of the user 102 and the direction of the first static marker 502. The user 102 then points the electronic device 104 toward the second static marker 504 to determine the direction of the second static marker with respect to magnetic north. An angle θ2 is determined with respect to a direction of the user 102 and the direction of the first static marker 502. The user 102 then points the electronic device 104 toward the third static marker 508 to determine the direction of the third static marker with respect to magnetic north. An angle θ3 is determined with respect to a direction of the user 102 and the direction of the first static marker 402.

Based on the determined directions and angles of the user 102, the first static marker 502, the second static marker 504, and the third static marker 508, the electronic device 104 computes the intersection point 506 of the determined directions of the first static marker 502, the second static marker 504, and the third static marker 508. Based on the computed intersection point 506 of the determined directions of the first static marker 502, the second static marker 504, and the third static marker 508, the electronic device 104 identifies a location of the electronic device 104 in the indoor environment at the intersection point 506. The location identification of the electronic device is shown in an identifiable color shade in a circular form at the intersection point 506. By including more than 2 static markers, The location identification of the electronic device can be performed in a more accurate manner. Any number of static markers can be used.

FIG. 6 is an illustration of identifying a location of an object in an indoor environment according to various embodiments of the present disclosure.

Referring to FIG. 6, a user 102 is initially in a first location 610. Here, the user 102 is disposed the same as the procedure described above in regard to FIG. 4 or 5. After the user is disposed, the user 102 points an electronic device toward the object 106a to determine a direction of the object 106a in the indoor environment with respect to the first location 610 of the user 102. An angle θ1 is determined with respect to a direction of the user 102 and the direction of the object 106a.

The user is then moved to a second location 620. Here, the user is disposed the same as the procedure described above in regard to FIG. 4 or 5. After the user is disposed, the user 102 again points the electronic device toward the object 106a to determine a direction of the object 106a in the indoor environment with respect to the second location 620 of the user 102. An angle θ2 is determined with respect to a direction of the user 102 and the direction of the object 106a.

Based on the determined directions and angles of the object 106a in the indoor environment with respect to the first location 610 of the user 102 and the second location 620 of the user 102, the electronic device computes the intersection point 630 of the determined direction of the object 106a. After computing the intersection point 630 of the determined direction of the object 106a, the electronic device 104 identifies a location of the object 106a in the indoor environment at the intersection point 630. Any number of user locations can be used.

Figure 7:
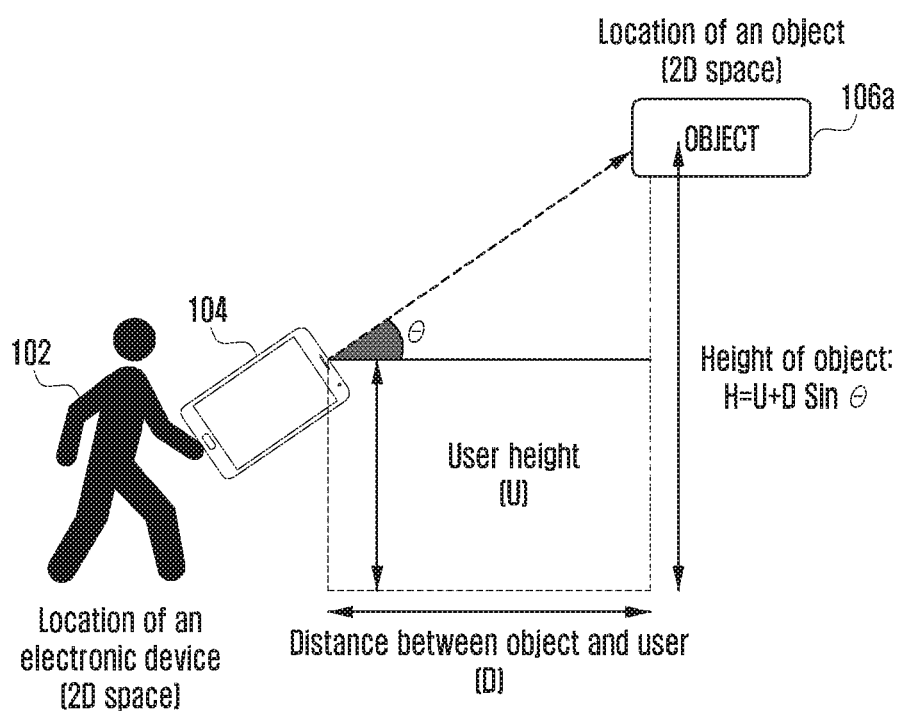
FIG. 7 is another illustration of identifying a location of an object in an indoor environment according to various embodiments of the present disclosure.

FIG. 7 is another illustration of identifying a location of an object in an indoor environment according to various embodiments of the present disclosure.

Referring to FIG. 7, a location identification process is initially performed as described above in regard to FIGS. 4, 5 and 6, and a user height (U) is provided as an additional input to the electronic device 104. in this case, the user 102 points the electronic device 104 toward the object 106a, and the electronic device 104 determines an angle θ with respect to a position of the user 102 and the object 106a. Based on the determined angle θ, the electronic device 104 computes the distance D between the object 106a and the user 102 by using any number of existing techniques.

The electronic device 104 also finds a height H of the object 106a from a ground surface by solving the following Equation 1:

$$H = U + D\sin\theta,\quad\quad\text{Equation (1)}$$

where is the height of the object 106a, U is the height of the user 102, D is the distance between the object 106a and the user 102, and θ is the angle with respect to the position of the user 102 and the object 106a. Based on the vertical height of the object 106a from the ground surface, the electronic device 104 disposes the object 106a in the indoor environment in a 3D manner.

Figure 8:
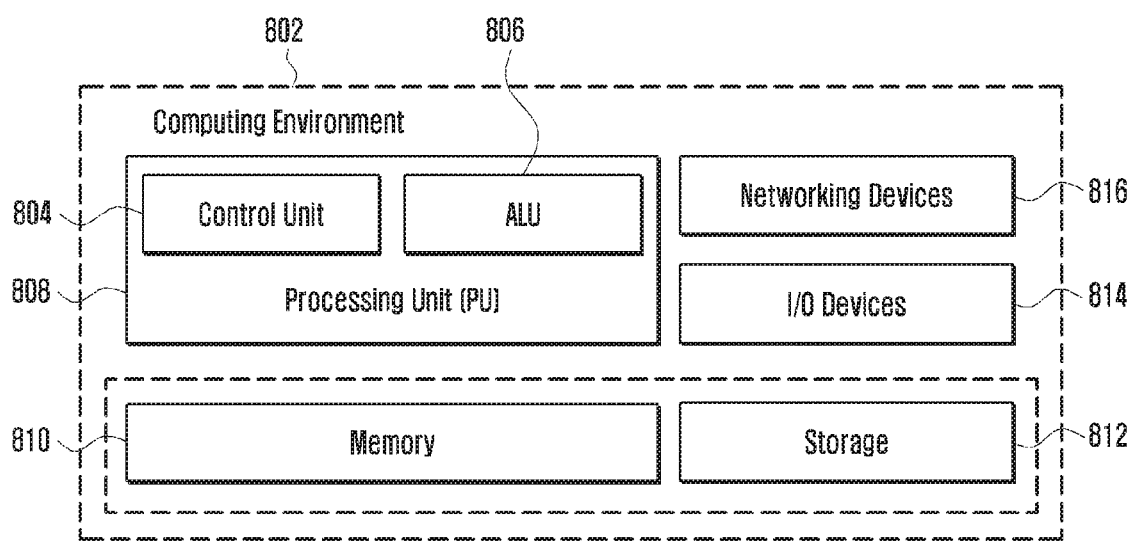
FIG. 8 is a block diagram of a computing environment implementing an indoor environment location identifying method according to various embodiments of the present disclosure.

FIG. 8 is a block diagram of a computing environment implementing an indoor environment location identification method according to various embodiments of the present disclosure.

Referring to FIG. 8, a computing environment 802 includes at least one processing unit 808 that is equipped with a control unit 804 and an arithmetic logic unit (ALU) 806, a memory 810, a storage unit 812, a plurality of networking devices 816 and a plurality input/output (I/O) devices 814. The processing unit 808 is responsible for processing instructions, such as instructions of an algorithm for performing operations such as those described above in regard to FIGS. 3 to 7. The processing unit 808 receives commands from the control unit in order to perform the processing. Further, logical and arithmetic operations involved in the execution of the instructions are computed with the assistance and/or cooperation of the ALU 806.

The overall computing environment 802 can include multiple homogeneous and/or heterogeneous cores, multiple central processing units (CPUs) of different kinds, special media and other accelerators. The processing unit 808 is responsible for processing the instructions of the algorithms. Further, the plurality of processing units 808 may be located on a single chip or distributed over multiple chips.

The algorithms can include instructions and codes required for the implementation and operations, such as those described above in regard to FIGS. 3 to 7, and are stored in either the memory unit 810 or the storage 812 or combinations thereof. At the time of execution, the instructions may he fetched from the corresponding memory 810 and/or storage 812, and executed by the processing unit 808.

In case of hardware implementations, the various networking devices 816 or external I/O devices 814 may be connected to the computing environment 802 to support the implementation through the networking unit and the I/O device unit.

The various embodiments disclosed herein can be implemented through at least one software program running on at least one hardware device and performing network management functions to control the elements. The elements shown in FIGS. 1, 2 and 8 include blocks which can be at least one of a hardware device, a software module, or a combination of hardware device and software module.

According to various embodiments of the present disclosure, at least part of a device (for example, modules, units or functions thereof) or a method (for example, operations) according to this disclosure, for example, as in a form of a programming module, may be implemented using an instruction stored in non-transitory computer-readable storage media. When at least one processor (for example, the processing unit 808) executes an instruction, it may perform a function corresponding to the instruction.

The non-transitory computer-readable storage media may include hard disks, floppy disks, magnetic media (for example, magnetic tape), optical media (for example, compact disc read only memory (CD-ROM), and digital versatile disc (DVD)), magneto-optical media (for example, floptical disk), and hardware devices (for example, read only memory (ROM), random access memory (RAM), or flash memory). Additionally, a program instruction may include high-level language code executable by a computer using an interpreter in addition to machine code created by a compiler. The hardware device may be configured to operate as at least one software module to perform an operation of various embodiments and vice versa.

A module or programming module according to various embodiments of the present disclosure may include at least one of the above-mentioned components, may not include some of the above-mentioned components, or may further include another component. Operations performed by a module, programming module, or other components according to various embodiments of the present disclosure may be executed through a sequential, parallel, repetitive or heuristic method. Additionally, some operations may be executed in a different order or may be omitted, and other operations may be added. Moreover, the embodiments disclosed in this specification are suggested for the description and understanding of technical content, but do not limit the range of the present disclosure. Accordingly, the range of the present disclosure should be interpreted as including all modifications or various other embodiments based on the technical idea of the present disclosure.

While the present disclosure has been shown and described with reference to various embodiments thereof, it will be understood by those skilled in the art that various changes in form and detail may be made therein without departing from the spirit and scope of the present disclosure as described by the appended claims and their equivalents.

What is claimed is:

1. An indoor environment location identification method, the method comprising:
    obtaining a visibility map including a first static marker and a second static marker in an indoor environment;
    determining a direction of the first static marker with respect to magnetic north by an electronic device if the electronic device is disposed to point at the first static marker;
    determining a direction of the second static marker with respect to the magnetic north in the electronic device if the electronic device is disposed to point at the second static marker; and
    identifying a location of the electronic device in the indoor environment by calculating an intersecting point based on the determined direction of the first static marker and the determined direction of the second static marker.

2. The method of claim 1, wherein the method further comprises:
    determining directions of pointing at an object in the indoor environment from a first location and a second location of the electronic device; and
    identifying a location of the object in the indoor environment by calculating an intersecting point of the determined directions of the object.

3. The method of claim 1, wherein the determining directions of the first static marker and the second static marker comprise:

disposing the electronic device based on a determined reference posture or reference direction of the electronic device; and disposing the electronic device disposed based on the reference posture or reference direction so that the electronic device points at the first static marker and the second static marker.

4. The method of claim 3, wherein the method further comprises:

identifying completion of disposition according to a user input if the electronic device is disposed to point at the first static marker and the second static marker.

5. The method of claim 2, wherein the location of the object is identified by considering a vertical disposition of the object from a ground surface in the indoor environment.

6. The method of claim 5, wherein the method further comprises:

identifying a vertical disposition of the object by pointing at the object vertically disposed.

7. The method of claim 1, wherein the method further comprises:

disposing the electronic device corresponding to the magnetic north;

determining directions of the first static marker and the second static marker based on the electronic device disposed corresponding to the magnetic north; and identifying a location of the electronic device based on the determined directions of the first static marker and the second static marker.

8. An electronic device comprising:

a sensor;

at least one processor electrically connected to the sensor; and a memory electrically connected to the at least one processor, wherein the memory is configured to store instructions which, when executed, cause the at least one processor to:

obtain a visibility map including a first static marker and a second static marker in an indoor environment, determine a direction of the first static marker with respect to magnetic north by the electronic device if the electronic device is disposed to point at the first static marker, determine a direction of the second static marker with respect to the magnetic north by the electronic device if the electronic device is disposed to point at the second static marker, and identify a location of the electronic device in the indoor environment by calculating an intersecting point based on the determined direction of the first static marker and the determined direction of the second static marker.

9. The electronic device of claim 8, wherein the at least one processor is configured to:

determine directions of pointing at an object in the indoor environment from a first location and a second location of the electronic device, and identify locations of the object in the indoor environment by calculating an intersecting point of the determined directions of the object.

10. The electronic device of claim 8, wherein the at least one processor is configured to:

dispose the electronic device based on a determined reference posture or reference direction of the electronic device, and dispose the electronic device disposed based on the reference posture or reference direction so that the electronic device points at the first static marker and the second static marker.

11. The electronic device of claim 10, wherein the at least one processor is configured to:

identify completion of disposition according to a user input if the electronic device is disposed to point at the first static marker and the second static marker.

12. The electronic device of claim 8, wherein the location of the object is identified by considering a vertical disposition of the object from a ground surface in the indoor environment.

13. The electronic device of claim 12, wherein the at least one processor is configured to:

identify a vertical disposition of the object if a user points at the object disposed vertically.

14. The electronic device of claim 8, wherein the at least one processor is configured to:

identify disposition of the electronic device corresponding to the magnetic north, determine directions of the first static marker and the second static marker based on the electronic device disposed corresponding to the magnetic north, and identify a location of the electronic device based on the determined directions of the first static marker and the second static marker.

15. A recording medium readable by a computer recorded with a program for executing a method of identifying a location of an electronic device, wherein the method comprises:

obtaining a visibility map including a first static marker and a second static marker in an indoor environment;

determining a direction of the first static marker with respect to magnetic north by an electronic device if the electronic device is disposed to point at the first static marker;

determining a direction of the second static marker with respect to the magnetic north by the electronic device if the electronic device is disposed to point at the second static marker; and identifying a location of the electronic device in the indoor environment by calculating an intersecting point based on the determined direction of the first static marker and the determined direction of the second static marker.

* * * * *